(12) United States Patent
Chen

(10) Patent No.: US 6,857,792 B2
(45) Date of Patent: Feb. 22, 2005

(54) DUPLEX LIGHT TRANSCEIVER MODULE

(76) Inventor: Wei-Wen Chen, 235 Chung-Ho Box 8-24, Taipei (TW)

( * ) Notice: Subject to any disclaimer, the term of this patent is extended or adjusted under 35 U.S.C. 154(b) by 95 days.

(21) Appl. No.: 10/348,226

(22) Filed: Jan. 22, 2003

(65) Prior Publication Data

US 2004/0141696 A1 Jul. 22, 2004

(51) Int. Cl.$^7$ .................................................. G02B 6/36
(52) U.S. Cl. ............................. 385/92; 385/93; 385/94
(58) Field of Search ............................... 385/92, 93, 94

(56) References Cited

U.S. PATENT DOCUMENTS 5,621,573 A * 4/1997 Lewis et al. ................. 359/634
5,796,899 A * 8/1998 Butrie et al. .................. 385/92

* cited by examiner

Primary Examiner—Hemang Sanghavi
Assistant Examiner—Eric Wong

(57) ABSTRACT

A duplex light transceiver module comprises a body having a light receiving module, a light transmitting module, and an optical fiber adaptor. The light emitting module has a laser diode chip and a metal header bearing the laser diode chip. A metal cap of the duplex transceiver module is combined with a round cylindrical focusing element which is installed ahead a light emitting end of the laser diode chip. One end of the cylindrical focusing element is formed with a ramp. A wavelength-division medium is evaporation-coated upon the ramp of the wavelength-division medium. The wavelength-division medium has different permeability so that light at one side facing the optical fiber adaptor will reflect light totally and light at one side facing the optical transmitting module will pass through the wavelength-division medium to be received by the light receiving module.

2 Claims, 3 Drawing Sheets

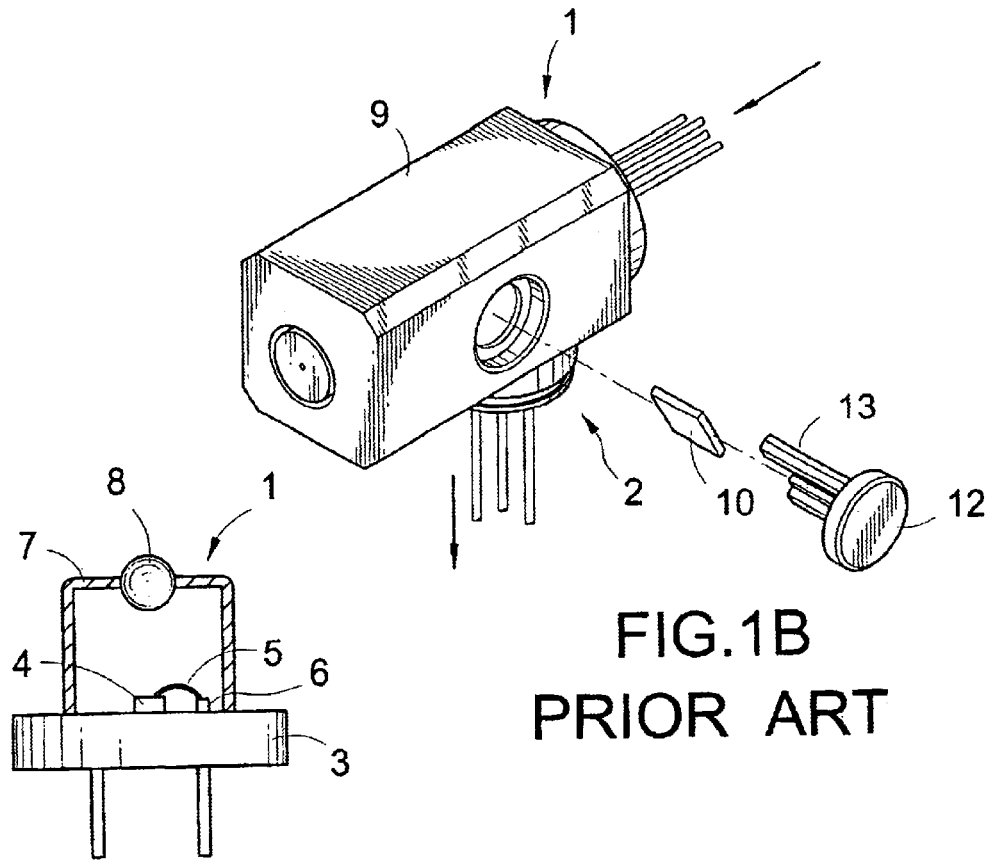
FIG.1B
PRIOR ART
FIG.1A
PRIOR ART
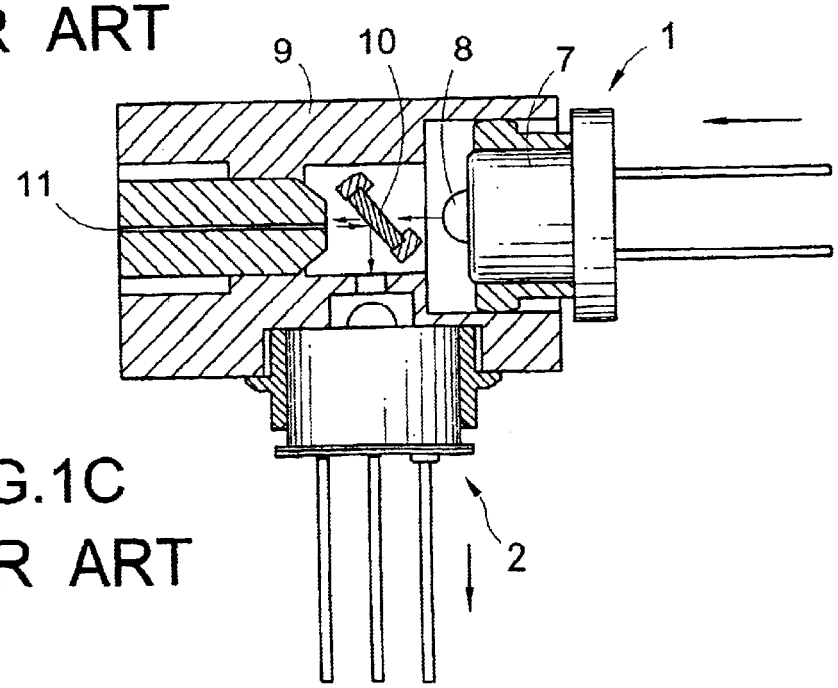
FIG.1C
PRIOR ART

DUPLEX LIGHT TRANSCEIVER MODULE

BACKGROUND OF THE INVENTION (1) Field of the Invention

The present invention relates to a duplex light transceiver module, more specifically to a duplex light transceiver module which can change focusing position of light transmitting and receiving without being constraint by the orientation of the optical lens. Thereby, the transmitting and receiving device are coupled to an optical fiber and optical detector.

(2) Description of the Prior Art

In current optical communication systems, generally laser diode chips are used as light source elements and light sensors are used as light detectors. A packaged laser diode chip is as a light transmitting module 1 and a packaged light sensors is as a light receiving module 2. Referring to FIG. 1a, it will be seen that in the prior art light transmitting module 1 or light receiving module 2, a laser diode chip 4 (or light sensors) is supported by a metal header 3, and is then connected to on electrode of the laser diode chip 4. Then, a leader 5 is connected to a leg 6 on the metal header 3 to thereby establish conduction with the other electrode of the laser diode chip 4. Finally, a metal cap 7 is applied as a lid structure to form a cover of the metal header. A spherical focusing element 8 is installed on the metal cap 7 and is positioned ahead of the light emitting end of the laser diode chip 4 in order that the light beam that is emitted from the light transmitting module 1 can project externally.

Referring to FIGS. 1B and 1C, it is shown that the light transmitting module 1 and the light receiving module 2 are finally mounted to the body 9. After packaging aforementioned sealing package structure, a duplex light transceiver module is formed. The interior of the body 9 is equipped with an optic filter 10. An upper and lower surfaces of the optical filter 10 are evaporated-coated with mediums of different permeabilities in order for the light beam incident from the laser diode 1 to be refraction-coupled to optical fiber 11 so that the received light beam is totally reflected via the optic filter 10 to the light sensor of the light receiving module 2.

The optic filter 10 is mounted to the frame 13 of the holder 12. After assembled, then the holder 12 is inserted into the body 9 and the optic filter 10 is adjusted to an optimum orientation so that the light beam radiates to the optic filter 10 will be reflected or refracted. That is to say, after the holder 12 is inserted into the body 9, the operator will always have to adjust and align the optic filter 10 to an optimum orientation position. However this operation is inconvenient.

SUMMARY OF THE INVENTION

Accordingly, the primary object of the present invention is to provide a duplex light transceiver module. The module comprises a body having a light receiving module, a light transmitting module, and an optical fiber adaptor. The light emitting module has a laser diode chip and a metal header bearing the laser diode chip. The laser diode chip has one end being connected to one electrode of the metal header and another end of the laser diode chip being connected to another electrode of the metal header through a conductor wire; and then a metal cap covering the metal header. The metal cap of the duplex transceiver module is combined with a round cylindrical focusing element which is installed ahead a light emitting end of the laser diode chip. One end of the cylindrical focusing element is formed with a ramp; a wavelength-division medium is evaporation-coated upon the ramp of the wavelength-division medium. The wavelength-division medium has different permeability so that light at one side facing the optical fiber adaptor will reflect light totally and light at one side facing the optical transmitting module will pass through the wavelength-division medium. When light emitted from the light transceiver module transmits into the round cylindrical focusing element, it will be further transmitted to a core of the optical fiber adaptor. When light emitted from the optical fiber adaptor, the light will be reflected by the wavelength-division medium.

BRIEF DESCRIPTION OF THE DRAWINGS

FIG. 1A is a cross-sectional view of a light emission module of a prior art design;

FIGS. 1B and 1C are perspective view of prior art duplex light transceiver module;

DETAILED DESCRIPTION OF THE PREFERRED EMBODIMENT

Figure 2:
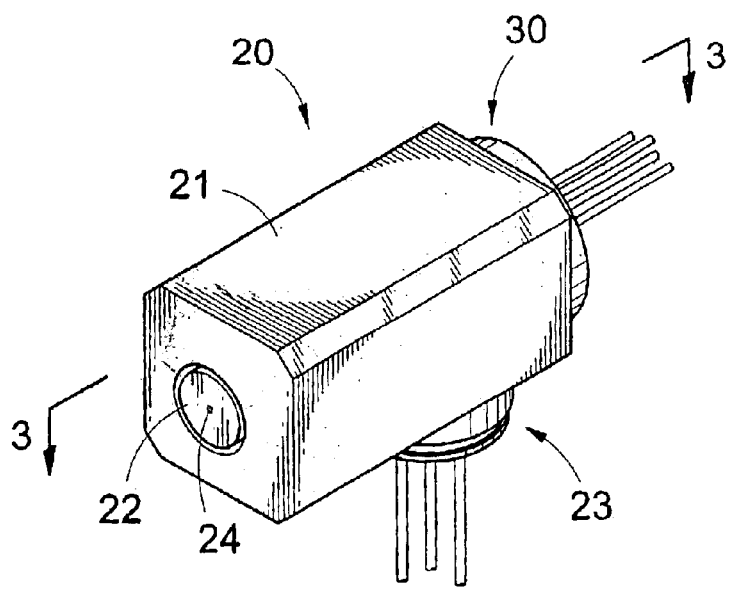
FIG. 2 is a perspective view of a duplex transceiver module according to the present invention.
Figure 3:
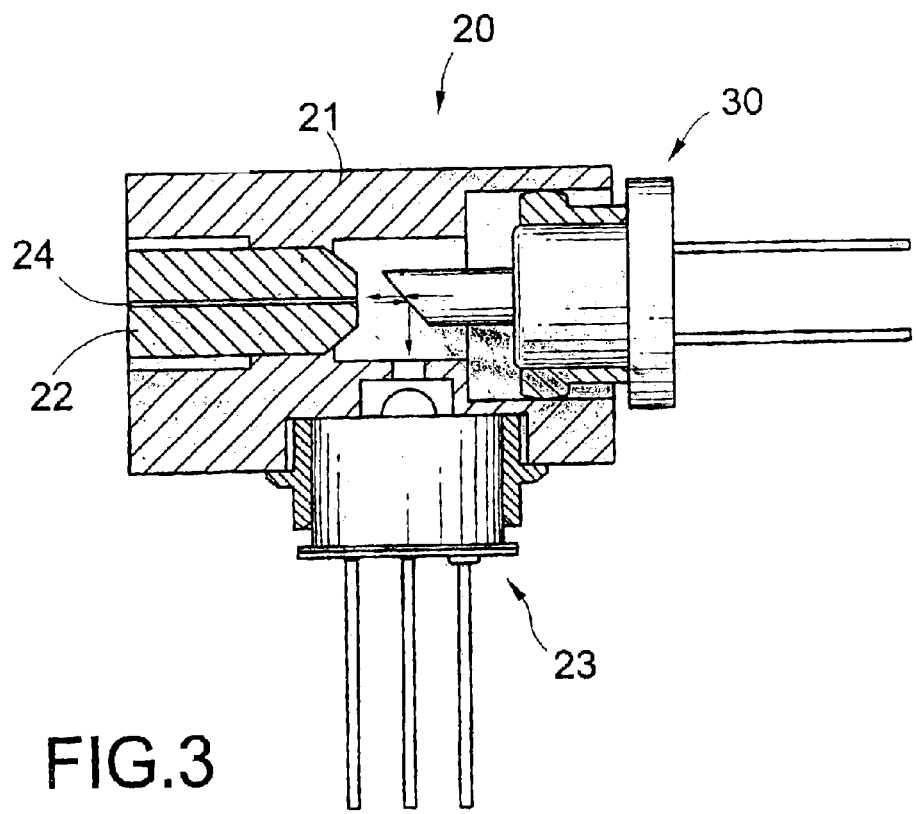
FIG. 3 is a cross-sectional view taken along line 3—3 of FIG. 2.

Referring to FIGS. 2 and 3, it will be appreciated that the duplex light transceiver module 20 of the present invention comprises a body 21. The body 21 includes a light receiving module 23, a light transmitting module 30 and an optical fiber connecting element 22 which are arranged with predetermined orientations. The optical fiber adaptor 22 is made of pottery or porcelain and includes coaxially an optical fiber 24. The light beam emitted from the light transmitting module 30 will be coupled the optical fiber 24, while light beam received is coupled to a light sensor of the light receiving module 23 through the optical fiber 24.

Figure 4:
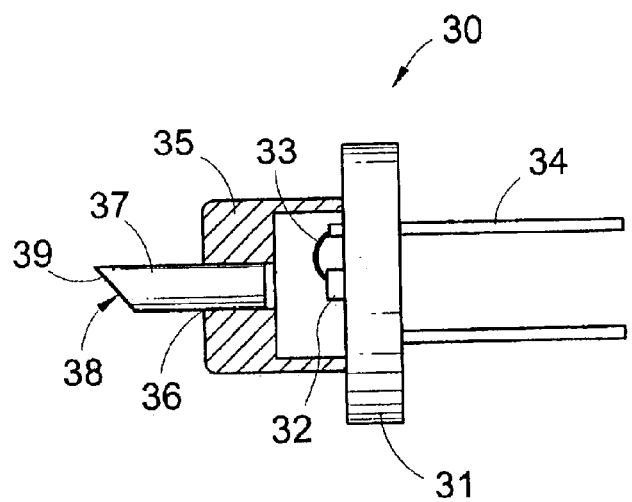
FIG. 4 is a cross-section view of the light transmitting module in one embodiment of the present invention; and, FIG. 5 shows the light path of the present invention.

FIG. 4 is a cross-section view showing one embodiment of the light transmitting module 30. In the light transmitting module 30, a metal header 31 is employed to bear a laser diode chip 32. Then it is connected to one electrode of the laser diode chip 32. Then it is further connected to the pins 34 of the metal header 31 by using metallic wire 33 and is electrically connected to another electrode of the laser diode chip 32. Finally, a metal cap 35 covers metal header 31.

Basically, in the present invention, a round cylindrical focusing element 37 of high refractivity is combined with an aperture 36 on the metal cap 35. Thereby, light beam emitted from the light transmitting module 30 is focused at a predetermined point of a predetermined distance from the front end of the focusing element 37, so that the beam is focally coupled to the core of the optical fiber 24.

One end surface of the cylindrical focusing element 37 is formed a ramp 38. The surface of the ramp is evaporation-coated with one layer of wavelength-division medium 39.

In the present invention, the wavelength-division medium has different permeability so that light at one side facing the optical fiber adaptor will reflect light totally and light at one side facing the optical transmitting module will pass through the wavelength-division medium. Thereby, hat light beam incident from the light transmitting module 30 is focused at a front end of the cylindrical focusing element 37 and then is focused on a more distance point. The focused light reflects on the ramp 39 due to the permeability of the wavelength-division medium 39. Then the light will be focused to a distant point.

Figure 5:
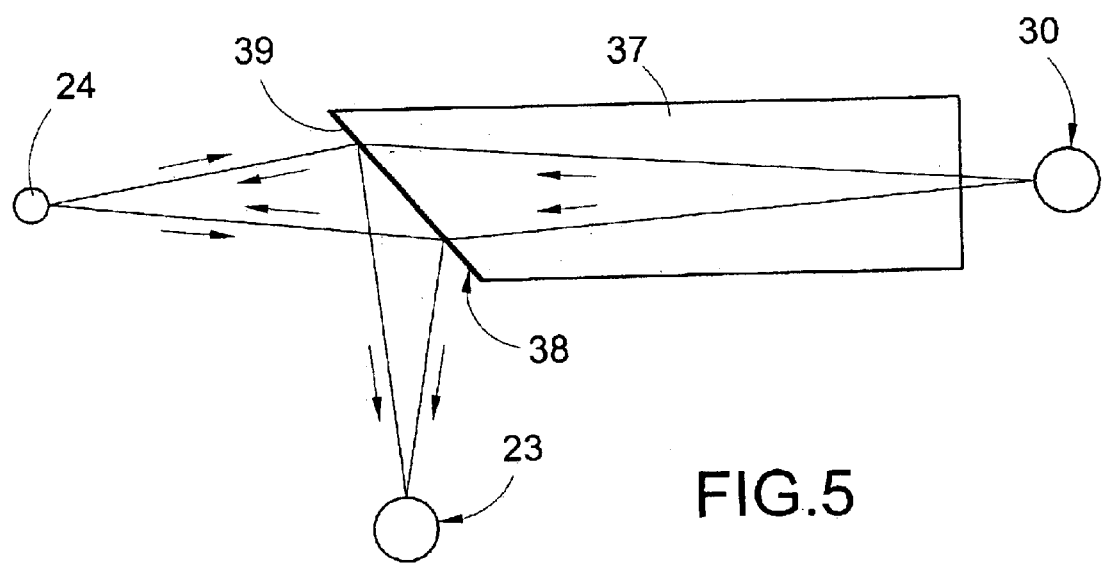

With reference to the light path shown in FIGS. 3 and 5, light beam emitted from the light transmitting module 30 is focused at the cylindrical focusing element 37 and then the light is coupled to the optical fiber 24. The light beam received by the optical fiber 24 is totally reflected by the wavelength-division medium 39 so as to be coupled to the light sensor of the light receiving module 23.

In summary, in the light transmitting module 30 of the present invention, the cylindrical focusing element 37 is combined to a light emitting front end of the laser diode chip 32. Then the light emitted from the light transmitting module 30 is focused by the cylindrical focusing element and is then coupled to the core of the optical fiber 24. An end portion of the cylindrical focusing element 37 has a ramp 38 and is evaporation-coated with a wavelength-division medium 39 which will simply reflect any light beam incident. Thereby, the light beam is further focused and coupled to the light sensor of the light receiving module 23. Namely, the cylindrical focusing element 37 of the present invention can be made with a lower cost, and is easily assembled, but can provide an accurate and efficient optical coupling operation.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

I claim:

1. A duplex light transceiver module comprising:
   a body having a light receiving module, a light transmitting module, and an optical fiber adaptor;
   the light emitting module having a laser diode chip and a metal header bearing the laser diode chip; the laser diode chip having one end being connected to one electrode of the metal header and another end of the laser diode chip being connected to another electrode of the metal header through a conductor wire; and
   a metal cap covering the metal header; characterized in that:
      the metal cap of the duplex transceiver module is combined with a round cylindrical focusing element which is installed ahead a light emitting end of the laser diode chip; one end of the cylindrical focusing element is formed with a ramp; a wavelength-division medium is evaporation-coated upon the ramp of the cylindrical focusing element; the wavelength-division medium has different permeability so that light at one side facing the optical fiber adaptor will reflect light totally and light at one side facing the optical transmitting module will pass through the wavelength-division medium;
      wherein when light emitted from the light transmitting module transmits into the round cylindrical focusing element; and then is further transmitted to a core of the optical fiber adaptor;
      when light emitted from the optical fiber adaptor; said light will be reflected by the wavelength-division medium to the light receiving module.

2. The duplex light transceiver module as claimed in claim 1, wherein the cylindrical focusing element is made of optical material of high refractive index.

* * * * *